(12) United States Patent
Subramaniam et al.

(10) Patent No.: US 11,456,870 B2
(45) Date of Patent: Sep. 27, 2022

(54) AUTHORIZATION TOKEN INCLUDING FINE GRAIN ENTITLEMENTS

(71) Applicant: T-Mobile USA, Inc., Bellevue, WA (US)

(72) Inventors: Komethagan Subramaniam, Redmond, WA (US); Michael Engan, Bellevue, WA (US); Ramkishan Sadasivam, Cummings, GA (US); Douglas McDorman, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 241 days.

(21) Appl. No.: 16/776,879

(22) Filed: Jan. 30, 2020

(65) Prior Publication Data

US 2020/0169405 A1    May 28, 2020

Related U.S. Application Data

(62) Division of application No. 15/828,266, filed on Nov. 30, 2017, now Pat. No. 10,587,409.

(51) Int. Cl.
*H04L 9/32*       (2006.01)
*G06F 9/30*       (2018.01)
*H04W 8/18*       (2009.01)

(52) U.S. Cl.
CPC ........ *H04L 9/3213* (2013.01); *G06F 9/30018* (2013.01); *H04L 9/3247* (2013.01); *H04W 8/18* (2013.01); *H04L 2209/56* (2013.01)

(58) Field of Classification Search
CPC ......... H04L 63/0807; H04L 63/10–102; H04L 9/3213; H04L 9/3247; H04L 2209/56; G06F 9/30018; H04W 8/18
See application file for complete search history.

(56) References Cited

U.S. PATENT DOCUMENTS 6,328,217 B1    12/2001    Everett et al.
6,668,322 B1    12/2003    Wood et al.
(Continued)

FOREIGN PATENT DOCUMENTS

WO    WO2019/079356 A1    4/2019

OTHER PUBLICATIONS

Stalling, Cryptograph and Network Security—Principles And Practice, 2011, Prentice Hall, pp. 360-400.*
(Continued)

*Primary Examiner* — Minh Dinh
(74) *Attorney, Agent, or Firm* — Lee & Hayes, P.C.

(57) ABSTRACT

A method of interpreting an authorization token is described herein. The service can receive an authorization token from a client device, and validate a signature of the authorization token. The service can identify an allowed function value associated at least part of an entitlement representation contained in a body of the authorization token. The service can convert the allowed function value to an allowed function bitmask that includes bits at a plurality of bit positions that are set to values indicating whether the subscriber element has attributes associated with each of the plurality of bit positions on a predefined attribute list. The service can determine whether the allowed function bitmask indicates that the subscriber element has one or more qualifying attributes that entitle a user of the client device to access the service.

20 Claims, 9 Drawing Sheets

(56) References Cited

U.S. PATENT DOCUMENTS

| | | |
|---|---|---|
| 6,842,863 B1 | 1/2005 | Fox et al. |
| 6,983,381 B2 | 1/2006 | Jerdonek |
| 7,711,122 B2 | 5/2010 | Allen et al. |
| 7,849,326 B2 | 12/2010 | Chao |
| 8,601,553 B1 | 12/2013 | Griffin et al. |
| 8,880,889 B1 | 11/2014 | Ward et al. |
| 9,240,886 B1 | 1/2016 | Allen et al. |
| 9,264,902 B1 | 2/2016 | Ward et al. |
| 9,331,990 B2 | 5/2016 | Le Saint |
| 9,462,473 B2 | 10/2016 | Ward et al. |
| 9,641,344 B1 | 5/2017 | Kim |
| 9,947,008 B1 | 4/2018 | Camacho Diaz |
| 10,505,916 B2 | 12/2019 | Engan et al. |
| 10,735,425 B2 | 8/2020 | Tran |
| 2003/0120610 A1 | 6/2003 | Hamber |
| 2006/0021004 A1 | 1/2006 | Moran et al. |
| 2006/0168446 A1 | 7/2006 | Ahonen et al. |
| 2006/0264202 A1 | 11/2006 | Hagmeier et al. |
| 2008/0189778 A1 | 8/2008 | Rowley |
| 2009/0328207 A1 | 12/2009 | Patel |
| 2010/0329464 A1 | 12/2010 | Kerschbaum |
| 2012/0144202 A1 | 6/2012 | Counterman |
| 2013/0031361 A1 | 1/2013 | Fahn et al. |
| 2013/0191884 A1 | 7/2013 | Leicher et al. |
| 2013/0219473 A1 | 8/2013 | Schaefer |
| 2013/0347071 A1 | 12/2013 | Polo Moragon et al. |
| 2014/0013396 A1 | 1/2014 | Field-Eliot et al. |
| 2014/0250003 A1 | 9/2014 | Levchin et al. |
| 2014/0325640 A1 | 10/2014 | Aggarwal et al. |
| 2014/0366080 A1 | 12/2014 | Gupta et al. |
| 2015/0113283 A1 | 4/2015 | Corella et al. |
| 2015/0150109 A1 | 5/2015 | Bocanegra et al. |
| 2015/0281362 A1 | 10/2015 | Shanmugam et al. |
| 2015/0295930 A1 | 10/2015 | Dixon et al. |
| 2015/0341330 A1 | 11/2015 | Field-Eliot et al. |
| 2016/0094531 A1 | 3/2016 | Unnikrishnan et al. |
| 2016/0142409 A1 | 5/2016 | Frei et al. |
| 2016/0241405 A1 | 8/2016 | Jeong et al. |
| 2016/0300223 A1 | 10/2016 | Grey et al. |
| 2016/0344635 A1 | 11/2016 | Lee et al. |
| 2017/0171187 A1 | 6/2017 | Yin et al. |
| 2017/0289197 A1 | 10/2017 | Mandyam et al. |
| 2018/0219863 A1 | 8/2018 | Tran |
| 2019/0044940 A1 | 2/2019 | Khalil et al. |
| 2019/0124070 A1 | 4/2019 | Engan et al. |
| 2019/0165942 A1 | 5/2019 | Subramaniam et al. |
| 2019/0312730 A1 | 10/2019 | Engan et al. |
| 2019/0312733 A1 | 10/2019 | Engan et al. |

OTHER PUBLICATIONS

3GPP; Technical Specification Group Services and System Aspects; 3rd Generation Partnership Project; Security Aspects; Study on Service Based Architecture (SBA) Security (Release 15), 3GPP TR 33.855 V0.1.0, May 2018. See Section 6.2.2.2.1 and Section 6.2.2 2.2, 33 pgs.

M. Jones et al., "Proof-of-Possession Key Semantics for JSON Web Tokens (JWTs)", IETF RFC 7800, Apr. 1, 2016 See pp. 4-9 and figures 1, 2.

The Non-Final Office Action for U.S. Appl. No. 15/788,731, dated Feb. 7, 2019, 20 pages.

The International Search Report and Written Opinion for PCT Application No. PCT/US2018/056157, dated Feb. 7, 2019, 9 pages.

Extended Search Report for EP Application 18847769.9, dated Mar. 10, 2021, 8 pgs.

Extended Search Report for EP Application 18868374.2, dated Mar. 9, 2021, 13 pgs.

Navas et al., "Nonce-based Authenticated Key Establishment over OAuth 2.0 IoT Proof-of-possession Architecture", IEEE third World Forum on Internet of Things, Dec. 2016, 7 pgs.

The Non-Final Office Action for U.S. Appl. No. 16/205,089, dated Mar. 12, 2021, 13 pages.

Final Office Action dated Jun. 7, 2019 for U.S. Appl. No. 15/788,731, 20 pgs.

Final Office Action dated Jun. 21, 2019 for U.S. Appl. No. 15/683,666, 12 pgs.

Non Final Office Action dated Feb. 8, 2019 for U.S. Appl. No. 15/683,666, 11 pgs.

Intl Search Report and Written Opinion dated Dec. 11, 2018, Intl Application PCT/US18/47373, 12 pgs.

\* cited by examiner

| Attribute List 202 ||
|---|---|
| Bit Positions 204<br>Set x to:<br>1 if has attribute, or<br>0 if does not have attribute | Attributes 114 |
| x | Postpaid |
| x0 | Prepaid |
| x00 | Active |
| x000 | Suspended |
| x0000 | Locked |
| x00000 | Can Add a Line |
| x000000 | Can Upgrade a Line |
| x0000000 | Can Cancel a Line |
| x00000000 | Can Change Billing Plan |
| x000000000 | Can Add Stored Payment Method |
| x0000000000 | Can Pay a Bill |
| x00000000000 | Can Swap SIM |
| x000000000000 | Can Change MSISDN |
| x0000000000000 | Is Exempt From Processing Fees |
| x00000000000000 | Can Waive Processing Fees |
| ... | ... |

FIG. 2

| | |
|---|---|
| Allowed Function Bitmask 302: | 1011011010001100 |
| Allowed Function Value 304: | 46732 |

FIG. 3

Entitlement Representation 402

```
"session":{
        "userId":" U-96be1cf7-788-11d6e12f9926 t",
        "AFs":[ "BYPASS_VERIFICATION","MANUAL_CARD_AUTHORIZATION" ]
},
"accounts":[
{
        "accountNumber":"987654320",
        "AFs":[ "PAH", "WAIVE_PROCESSING_FEE","PUSH_FEES_TO_BILL" ],
        "line":[
        {
                "MSISDN":"9876543210",
                "AFs":[ "ACTIVITY_ACCOUNT_OWNER",
                        "ACTIVITY_ACCOUNT_MANAGER",
                        "ACTIVITY_SUBSCRIBER_EDITOR", ........ ]
        },
        {
                "MSISDN":"9876543211",
                "AFs":[ "ACTIVITY_ACCOUNT_OWNER",
                        "ACTIVITY_ACCOUNT_MANAGER",
                        "ACTIVITY_SUBSCRIBER_EDITOR", ........ ]
        }]
},
{
        "accountNumber":"887654320",
        "AFs":[ "Restricted", "WAIVE_PROCESSING_FEE", "PUSH_FEES_TO_BILL",
                "EXEMPT_PROCESSING_FEE"  ],
        "line":[
        {
                "MSISDN":"8876543210",
                "AFs":["Restricted|SV","accounttype","accountsubtype",
                        "active|suspended_(in)volentary|canceled",
                        "ADJUSTMENTS_PER_FAN_IN_PERIOD",
                        "ACTIVITY_ACCOUNT_OWNER",
                        "ACTIVITY_A_MANAGER", ........ ]
        },
        {
                "MSISDN":"8876543211",
                "AFs":[ "ACTIVITY_ACCOUNT_OWNER",
                        "ACTIVITY_ACCOUNT_MANAGER",
                        "ACTIVITY_SUB_EDITOR", .......... ]
        }]
}]
```

FIG. 7

AUTHORIZATION TOKEN INCLUDING FINE GRAIN ENTITLEMENTS

CROSS REFERENCE TO RELATED APPLICATIONS

This is a divisional application which claims priority to commonly assigned, co-pending U.S. patent application Ser. No. 15/828,266, filed Nov. 30, 2017. Application Ser. No. 15/828,266 is fully incorporated herein by reference.

BACKGROUND

A telecommunications provider and/or third parties can offer various services to subscribers of the telecommunications provider's service. For example, parties can make servers available through which mobile phone users can pay a bill associated with their account, add a phone line to their account, receive a promotional offer, or request any other type of service.

However, some services can be limited to users that are associated with user accounts, billing accounts, and/or subscriptions that have specific attributes. For example, users with a prepaid billing account may be restricted from accessing a bill payment service that is intended for postpaid billing accounts. A service can accordingly check whether or not a user account, billing account, or subscription associated with a user has an attribute or combination of attributes that entitles the user to access the service.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2 depicts a non-limiting example of an attribute list.

FIG. 3 depicts an example of an allowed function bitmask.

FIG. 7 depicts an example of a decoded version of the entitlement representation of an authorization token.

DETAILED DESCRIPTION

Introduction

Figure 1:
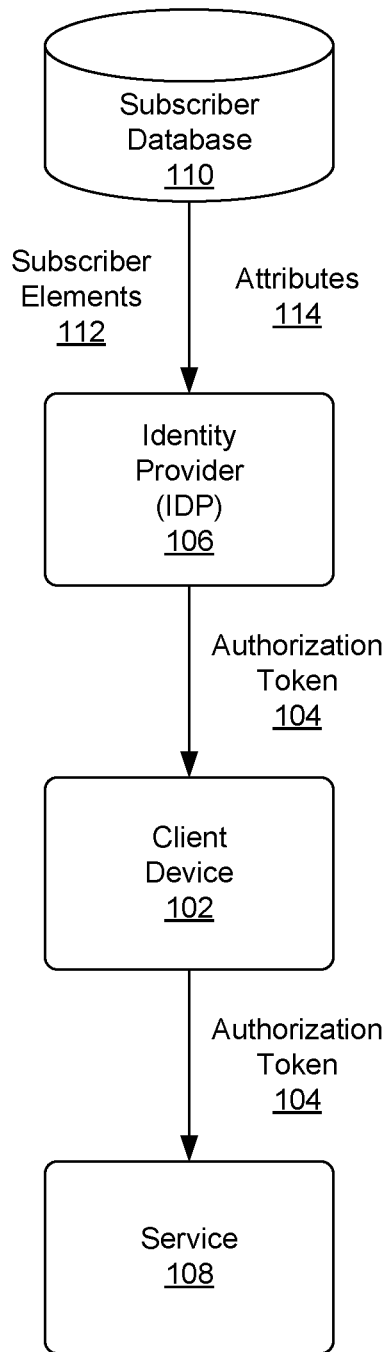
FIG. 1 depicts an example environment in which a client device receives an authorization token from an identity provider (IDP).

A telecommunications provider, such as a cellular carrier, can maintain information about attributes of individual subscriber elements that are associated with users of its service. Subscriber elements can include user accounts, billing accounts, and/or individual subscriptions.

The telecommunication provider, and/or third parties, can offer various services to users. Such services can include account management services, promotional services, and/or services of any other type.

However, access to some services can be restricted. When a user makes a request to a particular service, the attributes maintained by the telecommunication provider about the attributes of one or more of the user's subscriber elements can indicate whether or the user is entitled to access the service. For example, some services can be offered only to users associated with a subscriber element that has a particular attribute or a particular combination of attributes.

In existing systems, the process for determining whether a user is entitled to a particular service can be time consuming and/or involve numerous network calls. In these systems, a user can make a service request through a device. The device can be provisioned with an access token that identifies the user's user account and/or other subscriber elements. The device can provide this access token to a service's server when it makes a request to the service.

When a service's server receives an access token, it can make a network call to an authorization server or other server to validate the access token and confirm the identity of the user. The authorization server can also inform the service's server whether or not the user is entitled to access the service. Sending the access token from the service's server to the authorization server, validating it at the authorization server, and sending a reply from the authorization server to the service's server can take time.

Additionally, in many systems there can be multiple layers between the device making the request and the final service it is attempting to access. For instance, a memory in the device can provide the access token to a particular application, which then provides the access token to a networking layer, which then provides the access token to an application programming interface (API) proxy layer, and so on until the access token reaches the end service.

Often, there can be cascading lookups of the access token as some or all intermediate layers perform their own check of the access token with the authorization server. This can impose a processing load on the authorization server. For example, in some systems an authorization server can be asked three or more times to validate the same access token as the access token passes through intermediate layers on its way to an end service.

Cascading lookups can also introduce latency at each layer, increasing the time it takes for the end service to receive the access token, validate it, and respond to the request. In some cases, cascading lookups can introduce 50 to 200 milliseconds or more to the validation process.

Example Environment

FIG. 1 depicts an example environment in which a client device 102 receives an authorization token 104 from an identity provider (IDP) 106. The client device 102 can then provide the authorization token 104 to a service 108 when it makes a request to the service 108. As will be explained below, the authorization token 104 can include fine grain entitlement information that the service 108 can use to determine if a user of the client device 102 is eligible to make a request to the service 108.

A client device 102 can be a smart phone, a cellular phone, a personal digital assistant (PDA), a personal computer (PC), a laptop, a desktop, a workstation, a media player, a tablet, a gaming device, a smart watch, or any other type of computing or communication device.

An IDP 106 can be a server or other component that generates an authorization token 104. An example IDP 106 is illustrated in greater detail in FIG. 8 and is described in detail below with reference to that figure.

The IDP 106 can include, or have access to, a subscriber database 110 that stores information about subscriber elements 112 associated with a telecommunication provider's subscribers. Subscriber elements 112 can include user accounts, billing accounts, and/or subscriptions. In some examples, a user account can be identified with a userID, a billing account can be identified with a billing account number (BAN), and a subscription can be identified with a phone number such as a Mobile Station International Subscriber Directory Number (MSISDN). Multiple subscriber elements 112 can be associated with one another for a particular user. For example, a single user can have one or more billing accounts, such that one or more BANs can be associated with a particular userID. Similarly, one or more subscriptions can be associated with a single billing account, such that one or more MSISDNs can be associated with a particular BAN for a user.

The subscriber database 110 can include information about multiple attributes 114 that are associated with individual subscriber elements 112.

In some examples, an attribute 114 can indicate a specific quality of the subscriber element 112. For example, a billing account can have one attribute 114 that indicates that it is a prepaid billing account, or another attribute 114 that indicates that it is a postpaid billing account.

In other examples, an attribute 114 can indicate a particular function that a user has been permitted to perform in association with the subscriber element 112. For example, one attribute 114 can indicate that a particular user account is allowed to add a postpaid billing account, a second attribute 114 can indicate that a billing account can have a line added to it, and a third attribute 114 can indicate that a subscriber identification module (SIM) card can be swapped in association with a particular subscriber element 112.

As will be discussed below, functions that are permitted for a user due to a particular attribute 114, or a particular combination of attributes 114, can be referred to as allowed functions.

The IDP 106 can generate and/or provide an authorization token 104 to a client device 102. In some examples, the authorization token 104 can be a JavaScript Object Notation (JSON) Web Token (JWT). The contents of a JWT can be represented using JSON attribute-value pairs. In other examples, the contents of an authorization token 104 can be represented using Extensible Markup Language (XML), YAML, or any other format.

In some examples a subscriber can use a client device 102 to provide the authorization token 104 to one or more services 108 in order to manage the subscriber's account. A service 108 can provide an API through which the client device 102 can request the service. For example, the subscriber can use the client device 102 to make a request to a service 108 add a phone line to a particular billing account, upgrade a line, change a phone number, swap a SIM card, change a billing plan, pay a bill, add a stored payment method, make a payment, cancel a line, or perform any other service. In these examples the IDP 106 can provide an authorization token 104 to the client device 102 that includes fine grain entitlement information based on attributes 114 of the subscriber elements 112 associated with that subscriber.

In other examples, a client device 102 of an agent user can obtain an authorization token 104 based on the attributes 114 of a subscriber that is different from the agent user, and/or attributes 114 that are specific to the agent user. For example, a client device 102 of a customer service representative can obtain an authorization token 104 that has fine grain entitlement information based on attributes 114 of a particular subscriber, and/or attributes 114 specific to the customer service representative. Accordingly, the customer service representative's client device 102 can use the authorization token 104 to make service requests on the subscriber's behalf.

In some situations, the authorization token 104 provided to a user agent's client device 102 can be different than an authorization token 104 that would be provided to the subscriber's client device 102. For example, while a customer service representative's device can obtain an authorization token 104 that indicates attributes 114 of a particular subscriber, that authorization token 104 can also indicate attributes 114 that additionally allow the customer service representative to waive certain fees or provide a certain level of credit to the subscriber through one or more services 108.

As shown in FIG. 1, the IDP 106 can provide an authorization token 104 to a client device 102 associated with the subscriber elements 112. The client device 102 can in turn provide the authorization token 104 to a server of a service 108 when it makes a request to the service 108. For example, a web browser or other application that presents an account management user interface can send a service request and an authorization token 104 to a server of a service 108 to have the service 108 implement an account management function.

A server of a service 108 can receive a service request and authorization token 104 from a client device 102. The service 108 can identify attributes 114 associated with subscriber elements 112 directly from the fine grain entitlement information in the authorization token 104. Accordingly, the service 108 can locally determine if an attribute 114, or a combination of attributes 114, entitles the user associated with the authorization token 104 to access the service 108, without making a validation call over a network to the IDP 106 or another authorization server and waiting for a response to the validation call. An example server of a service 108 is illustrated in greater detail in FIG. 9 and is described in detail below with reference to that figure.

FIG. 2 depicts a non-limiting example of an attribute list 202. Telecommunications providers, network operators, services 108, and/or IDPs 106 can have a predefined attribute list 202 that includes possible attributes 114 that a subscriber element 112 may or may not have. A predefined attribute list 202 can have any number of possible attributes 114, such as tens or hundreds of attributes 114. Each attribute 114 on a predefined attribute list 202 can be associated in the attribute list 202 with a particular bit position 204, as shown in FIG. 2. For example, the first attribute 114 on the attribute list 202 can be associated with a first bit position 204, while the fifth attribute 114 on the attribute list 202 can be associated with a fifth bit position 204.

For a particular subscriber element 112, a bit at the bit position 204 associated with a particular attribute 114 can be set to one value if the subscriber element 112 has that attribute 114, or to a different value if the subscriber element 112 does not have that attribute 114. Although the description herein will use a bit set to "1" as indicating that a subscriber element 112 has an associated attribute 114 and a bit set to "0" as indicating that the subscriber element 112 does not have an associated attribute 114, in other examples the meaning of "0" and "1" can be reversed.

FIG. 3 depicts an example of an allowed function bitmask 302. An allowed function bitmask 302 can encapsulate information about all of the attributes 114 in the attribute list 202 for a particular subscriber element 112. As access to services 108 can be conditioned on a subscriber element 110 having a particular attribute 114 or a particular combination of attributes 114, an allowed function bitmask 302 can be used to identify allowed functions associated with a subscriber element 112.

An allowed function bitmask 302 can be generated for a subscriber element 112 by setting bits at bit positions 204 associated with each of the attributes 114 in the predefined attribute list 202 to either "1" or "0," based on whether or not the subscriber element 112 has those attributes 114. For example, an allowed function bitmask 302 of "01101" generated for a subscriber element 112 from a predefined list attribute list 202 of five attributes 114 would indicate that the subscriber element 112 has the first, third, and fourth attributes 114 on the attribute list 202, but does not have the second and fifth attributes 114 on the attribute list 202.

In some examples, for a particular subscriber element 112, a separate bitmask can be generated for each attribute 114 in the attribute list 202 by setting a bit at a corresponding bit position 204 to "1" or "0," and setting trailing bit positions 204 to "0," as shown in FIG. 2. For example, if a user account has the sixth attribute 114 on the attribute list 202, the bitmask specific to the sixth attribute 114 would be "100000." The separate bitmasks for each of the attributes 114 in the attribute list 202 can then be summed together to determine a final allowed function bitmask 302 that encapsulates information about all of the attributes 114 in the attribute list 202 for the subscriber element 112. In other examples, the bits of an allowed function bitmask 302 can be set as "0" or "1" directly based on a subscriber element's attributes 114 and their associated bit positions 204.

Accordingly, an allowed function bitmask 302 for a subscriber element 112 can indicate whether a particular function is or is not an allowed function for that subscriber element 112, based on the value of bits at one or more bit positions 204. For instance, if a function is allowed only for subscriber elements 112 that have a particular attribute 114, the function can be allowed if the bit at the bit position 204 corresponding to that attribute 114 is set to "1" in the allowed function bitmask 302. Similarly, if a function is allowed only for subscriber elements 112 that have a particular combination of attributes 114, the function can be allowed if the bits at the bit positions 204 corresponding to those attributes 114 are all set to "1" in the allowed function bitmask 302.

A service 108 can accordingly be set to condition access to users based on the attributes of their subscriber elements 112, such that the service 108 is an allowed function for a user only if the user's allowed function bitmask 302 indicates that the user's subscriber elements 112 have one or more attributes 114 that entitle the user to access the service 108. For example, a promotional service 108 can be set to qualify users to receive a free taco if the user's client device 102 provides an authorization token 102 with an allowed function bitmask 302 indicating that a subscriber element 112 has a "prepaid" attribute 114 and an "active" attribute 114, or any other combination of one or more attributes 114. Accordingly, the promotional service 108 can qualify users for its promotion based on one or more existing attributes 114 on the predefined attribute list 202, rather than having a new "eligible for free taco" attribute 114 to the predefined attribute list 202.

An allowed function bitmask 302 expressed in binary can be converted into an allowed function value 304 that is expressed using another numeral system, and/or with another data type of a language compatible with a compiler or interpreter. For example, FIG. 3 depicts an example of a binary allowed function bitmask 302 converted into a decimal allowed function value 304. In other examples, the binary allowed function bitmask 302 can be converted to a hexadecimal allowed function value 304, an allowed function value 304 expressed in any other numeral system, or an allowed function value 304 expressed using any other data type.

Figure 4:
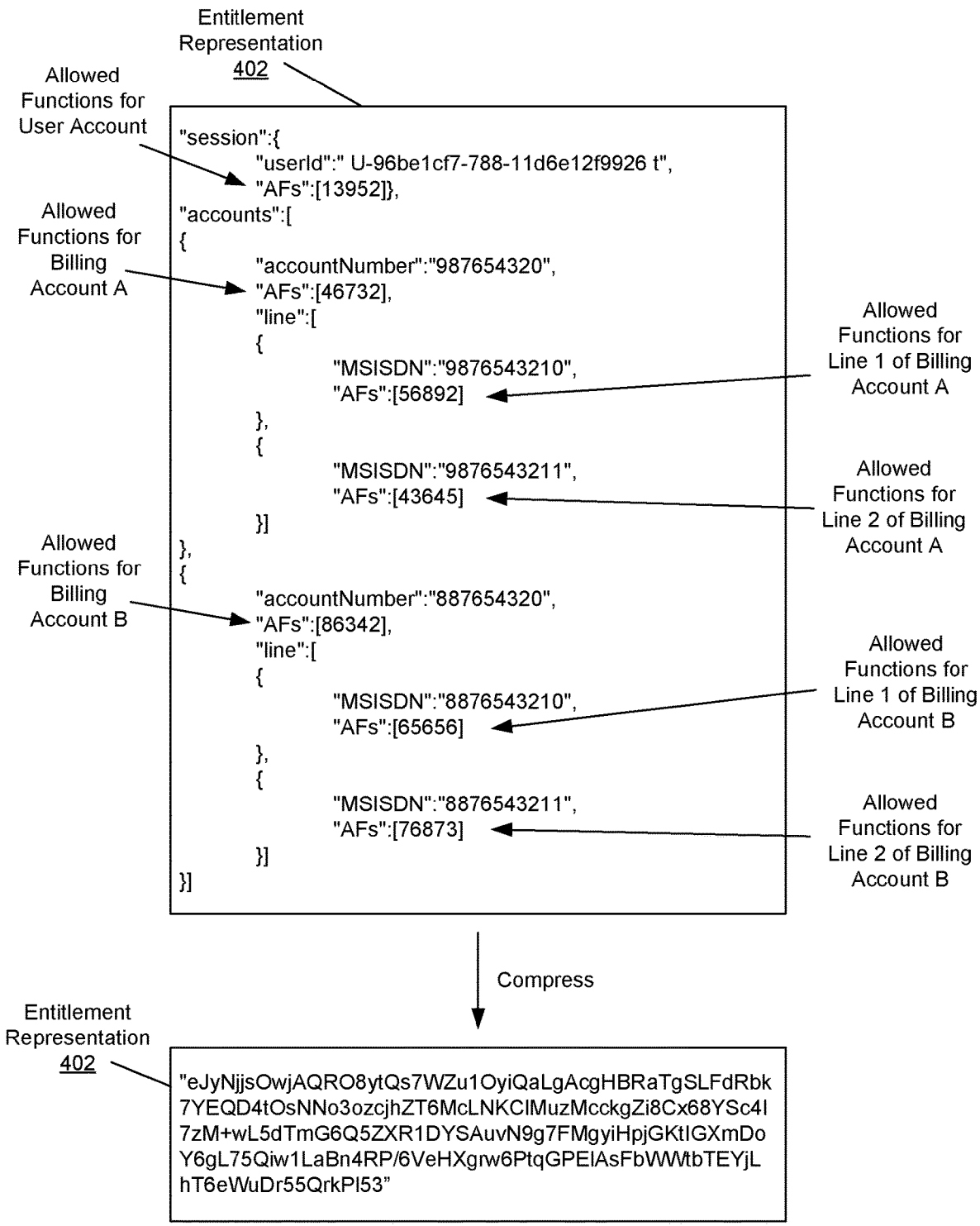
FIG. 4 depicts an example of an entitlement representation for an authorization token.

FIG. 4 depicts an example of an entitlement representation 402 for an authorization token 104. In some examples, an entitlement representation 402 can be expressed using JSON, as shown in FIG. 4. In other examples, entitlement representations 402 can be expressed using XML, YAML, or any other format.

An entitlement representation 402 can include information about one or more subscriber elements 112. For example, as shown in FIG. 4, an entitlement representation 402 can include information about a user account identified by a "userID" value, two billing accounts identified by BANs that are associated with the user account, two MSISDNs associated with the first billing account, and two more MSISDNs associated with the second billing account.

The entitlement representation 402 can include an allowed function bitmask 302 or allowed function value 304 associated with each of the subscriber elements 112. For example, each subscriber element 112 can be associated in the entitlement representation 402 with a decimal allowed function value 304 generated from the complete set of attributes 114 for that subscriber element 112. Although FIG. 4 shows decimal allowed function values 304 in the entitlement representation 402, in other examples the entitlement representation 402 can include the original binary allowed function bitmasks 302, include hexadecimal allowed function values 304, or express the allowed function bitmask 302 in any other format.

Although FIG. 4 shows five digit decimal allowed function values 304 for brevity, decimal allowed function values 304 can have any number of digits. For example, when a predefined attribute list 202 has 150 attributes 114, the allowed function bitmask 302 can have 150 bits and a corresponding decimal allowed function value 304 can have 46 digits.

As shown in FIG. 4, in some examples an entitlement representation 402 can be compressed and/or encoded. For example, GZIP or any other compression algorithm can be used to compress the entitlement representation 402 so that it can be expressed using fewer characters and/or bits. The compressed entitlement representation 402 can also be encoded in a manner such that it printable with a set of known characters. For example, the compressed entitlement representation 402 can be Base64 encoded.

Figure 5:
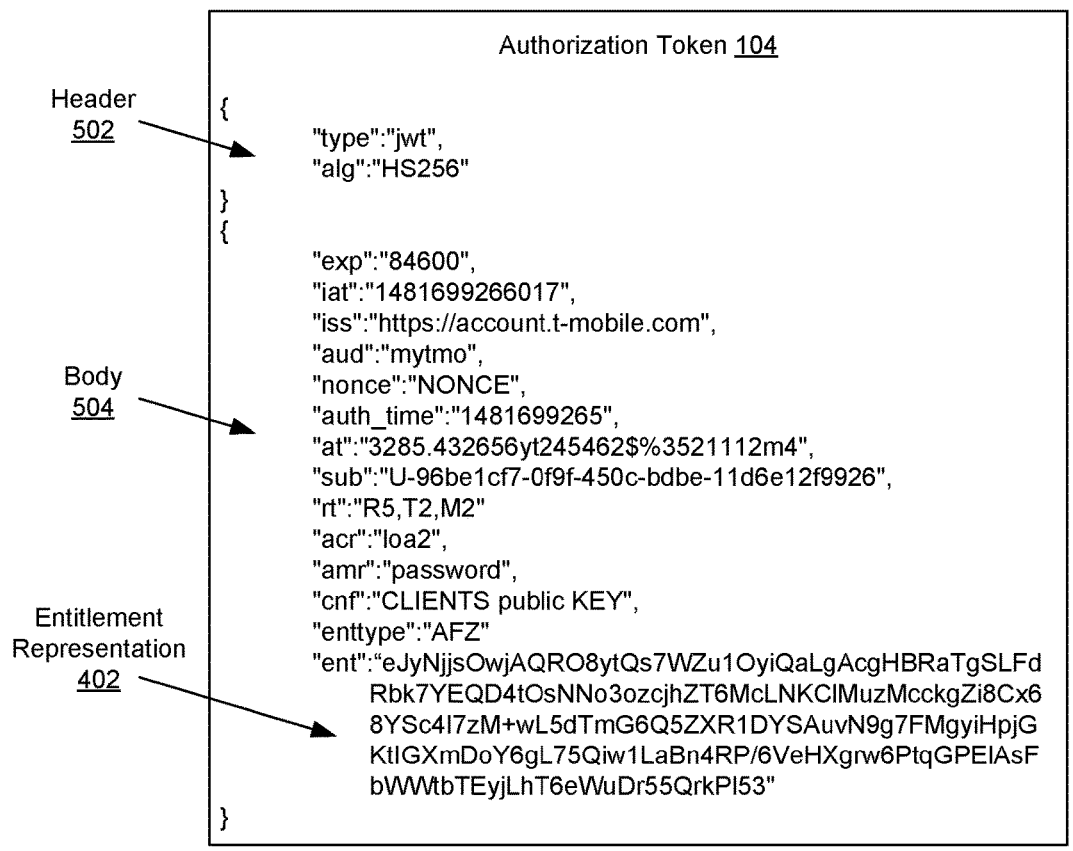
FIG. 5 depicts the header and body of an exemplary authorization token.

FIG. 5 depicts the header 502 and body 504 of an exemplary authorization token 104. As with the entitlement representation 402, the header 502 and/or body 504 of an authorization token 104 can express information using JSON, XML, YAML, or any other format. When the authorization token 104 is a JWT, the header 502 and body 504 can be expressed in JSON.

The header 502 can identify the type of the authorization token 104 and/or a cryptographic algorithm used to sign the authorization token 104. For example, the header 502 can indicate that the authorization token 104 is a JWT and that it was signed using a RSASSA-PKCS1-v1_5 using SHA-256 (HS256) algorithm.

The body 504 can be a payload including one or more claims asserted by the authorization token 104. As will be discussed below, when the authorization token 104 is signed and the signature can be validated by a service 108, the service 108 can trust that the claims in the body 504 are accurate. Claims can indicate an expiration time ("exp") of the authorization token 104, a time when the authorization token 104 was issues ("iat"), an issuer ("iss") of the authorization token 104, such as the IDP 106, an audience ("aud") identifying intended recipients of the authorization token 104, and/or any other type of claim.

In particular, the body 504 can include the entitlement representation 402, which itself includes information about the attributes 114 of one or more subscriber elements 112 as described above. In some examples, the body 504 can include a compressed version of the entitlement representation 402, as shown in FIG. 5. In other examples the body 504 can include a non-compressed version of the entitlement representation 402. The body 504 can also include a claim identifying a type of the entitlement representation 402 ("enttype"). For example, in FIG. 5 "AFZ" is included for the "enttype" claim, with "AF" indicating that the entitlement representation 402 includes allowed function information, such as a decimal allowed function value 304, and "Z" indicating that the entitlement representation 402 was compressed using the GZIP algorithm. Accordingly, a recipient can decompress the entitlement representation 402 based on the "enttype" claim's identification of the algorithm used to compress the entitlement representation 402.

Figure 6:
FIG. 6 depicts an example of an authorization token in an encoded and signed form.

FIG. 6 depicts an example of an authorization token 104 in an encoded and signed form. In the example of FIG. 6, the authorization token 104 is a JWT in which encoded forms of the header 502, body 504, and signature 602 are concatenated together with a dot separating each part of the JWT. For example, the header 502, body 504, and signature 602 can be Base64 encoded. The example encoded body 504 shown in FIG. 6 has been shortened for brevity, as in some situations a compressed version of an entitlement representation 402 that encompasses information about tens or hundreds of attributes 114 can make the encoded body 504 longer than is shown in FIG. 6.

The signature 602 can be generated by the IDP 106 or other signing entity using a cryptographic algorithm. For example, the IDP 106 can have a private key and a corresponding public key, and can use the private key in a digital signature function or other cryptographic algorithm on original or encoded versions of the header 502 and the body 504 to generate the signature 602. As noted above, the cryptographic algorithm used to sign the authorization token 104 can be identified in the header 502 of the authorization token 104. The generated signature 602 can be added to the authorization token 104. For example, the signature 602 can be concatenated to representations of the header 502 and/or body 504 as discussed above.

In some examples the IDP 106 can generate the signature 602 and sign the final authorization token 104 as described above. However, in other examples an IDP 106 can provide an authorization token 104 to a client device 102 that includes a public key of the client device 102, and the client device 102 can then generate a final authorization token 104 that encapsulates the IDP's authorization token 104 and is signed by the client device 102.

When the signature 602 is provided to a service 108 along with the rest of the authorization token 104, the service 108 can locally validate the signature 602 using the issuer's public key. Because the signature 602 was generated based on the header 502 and the body 504, when the service 108 can validate the signature 602, the service 108 can verify that the header 502 and the body 504 were not altered after the authorization token 104 was signed. Accordingly, the service 108 can trust the fine grain entitlements embedded in the authorization token's entitlement representation 402 without making a validation network call to the IDP 106 or other authorization server.

FIG. 7 depicts an example of a decoded version of the entitlement representation 402 of an authorization token 104. When a service 108 verifies the signature 602 of an encoded authorization token 104, it can decode the authorization token's header 502 and body 504. If the entitlement representation 402 in the body 504 was encoded and/or compressed, the service 108 can decode and/or decompress the entitlement representation 402. For example, a service 108 can Base64 decode the entitlement representation 402, identify a compression scheme used on the entitlement representation 402 from an "enttype" field in the body 504, and reverse the compression based on the identified compression scheme.

The service 108 can determine which attributes 114 are associated with the subscriber elements 112. In some examples the service 108 can convert a decimal allowed function value 304 into an allowed function bitmask 302, so that it can review values of bits in one or more specific bit positions 204 to determine if a subscriber element 112 has corresponding attributes 114. As shown in FIG. 7, in some examples the service 108 can generate a list of text string descriptions corresponding to attributes 114 and/or allowed functions for a subscriber element 112 based on bits in the allowed function bitmask 302 that are set to "1," such that the attributes 114 are human-readable.

In some examples, a telecommunication provider can provide a library of files to a server of a service 108 that can assist in validating and/or interpreting an authorization token 104 received by the service 108. For example, a library can include a copy of the predefined attribute list 202. As another example, a library can include one or more scripts and/or applications that can locally validate a signature 602, decode the header 502 and/or body 504 of an authorization token 104, decompress an entitlement representation 402, and/or convert allowed function values 304 into machine and/or human-readable descriptions of attributes 114 associated with a subscriber element 112.

Example Architecture

Figure 8:
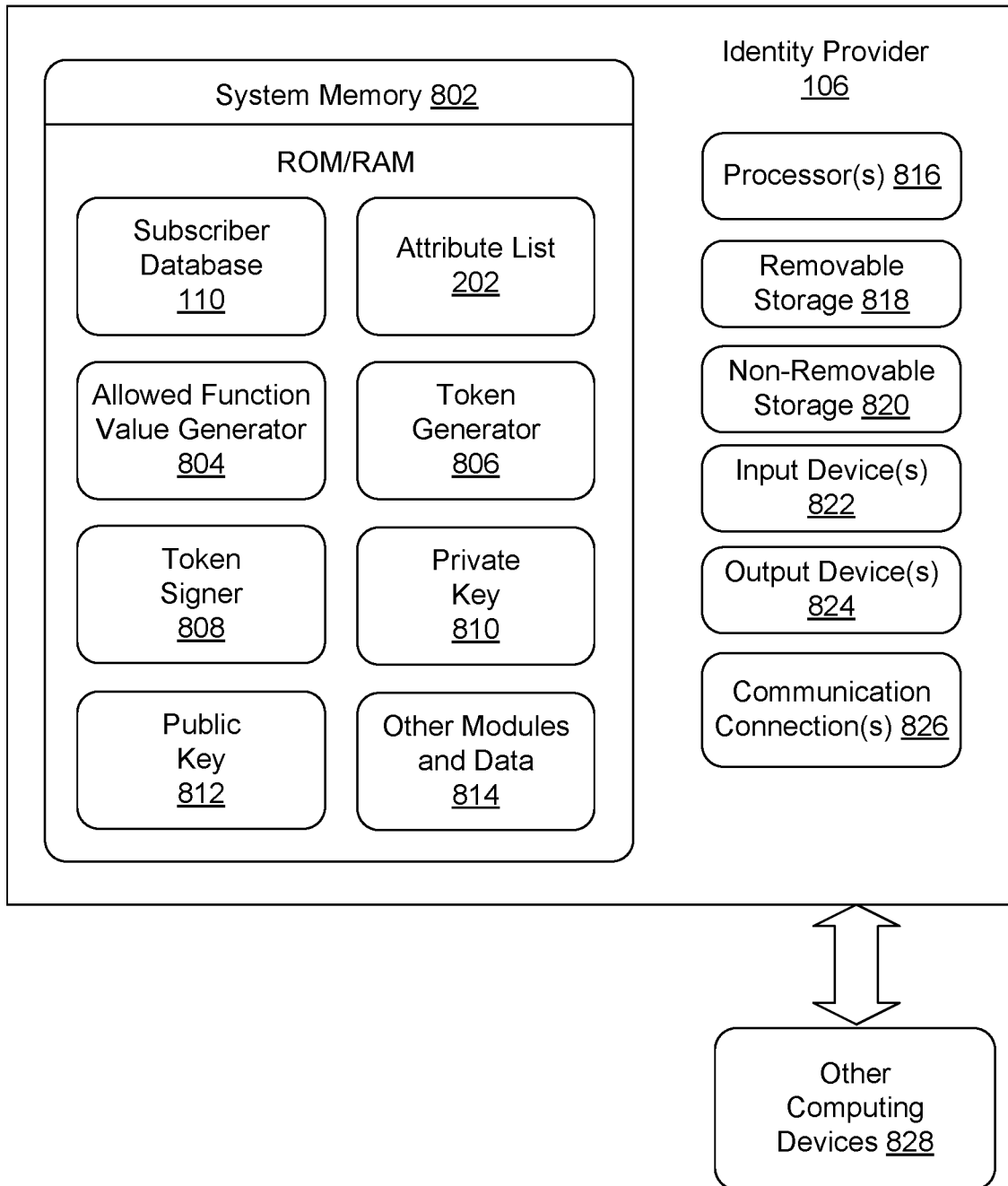
FIG. 8 illustrates an example architecture of an IDP.

FIG. 8 illustrates an example architecture of an IDP 106. The IDP 106 can have a system memory 802. The system memory 802 can store data for the subscriber database 110, the attribute list 202, an allowed function value generator 804, a token generator 806, a token signer 808, a private key 810, a public key 812, and/or other modules and data 814. The IDP 106 can also include processor(s) 816, removable storage 818, non-removable storage 820, input device(s) 822, output device(s) 824, and/or communication connections 826 for communicating with other computing devices 828.

In various examples, system memory 802 is volatile (such as RAM), non-volatile (such as ROM, flash memory, etc.), or some combination of the two. Example system memory 802 can include one or more of RAM, ROM, EEPROM, a Flash Memory, a hard drive, a memory card, an optical storage, a magnetic cassette, a magnetic tape, a magnetic disk storage or another magnetic storage devices, or any other medium.

The subscriber database 110 and attribute list 202 are described in greater detail above. In some examples the subscriber database 110 and/or attribute list 202 can be stored directly in the system memory 802 of the IDP 106. In other examples the subscriber database 110 and/or attribute list 202 can be stored elsewhere, such as at a separate server of a telecommunication provider, and the IDP 106 can access data from the subscriber database 110 and/or attribute list 202 remotely.

The allowed function value generator 804 can generate allowed function bitmasks 302 and/or allowed function values 304 for individual subscriber elements 112. The allowed function value generator 804 can use bit positions 204 in an attribute list 202 and associated attributes 114 of subscriber elements 112 from the subscriber database 110 to generate the allowed function bitmasks 302 and/or allowed function values 304 as described in more detail above.

The token generator 806 can generate the header 502 and/or body 504 of an authorization token 104, including a compressed or non-compressed entitlement representation 402 that includes allowed function bitmasks 302 or allowed function values 304 generated by the allowed function value generator 804. In some examples the token generator 806 can also encode a compressed entitlement representation 402 to express it in a set of printable characters, for instance using Base64 encoding.

The token signer 808 can use the IDP's private key 810 to generate a signature 602 from the header 502 and/or body 504 of an authorization token 104. The signature 602 can then be added to the authorization token 104 as described above. The private key 810 and public key 812 can be related such that the public key 812, when distributed to a service 108, can be used by the service 108 to verify the signature 602.

The other modules and data 814 can be utilized by the IDP 106 to perform or enable performing any action taken by the IDP 106. The other modules and data 814 can include a platform and applications, and data utilized by the platform and applications.

In some embodiments, the processor(s) 816 is a central processing unit (CPU), a graphics processing unit (GPU), or both CPU and GPU, or other processing unit or component known in the art.

IDP 106 can also include additional data storage devices (removable and/or non-removable) such as, for example, magnetic disks, optical disks, or tape. Such additional storage is illustrated in FIG. 8 by removable storage 818 and non-removable storage 820. Computer storage media may include volatile and nonvolatile, removable and non-removable media implemented in any method or technology for storage of information, such as computer readable instructions, data structures, program modules, or other data. System memory 802, removable storage 818 and non-removable storage 820 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by IDP 106. Any such computer-readable storage media can be part of IDP 106.

In various examples, any or all of system memory 802, removable storage 818, and non-removable storage 820, store programming instructions which, when executed, implement some or all of the above-described operations of the IDP 106.

IDP 106 can also have input device(s) 822, such as a keyboard, a mouse, a touch-sensitive display, voice input device, etc., and output device(s) 824 such as a display, speakers, a printer, etc. These devices are well known in the art and need not be discussed at length here.

IDP 106 can also contain communication connections 826 that allow the IDP 106 to communicate with other computing devices 828, such as client devices 102 or other servers or components of a telecommunication provider. By way of a non-limiting example, communication connections 826 can transmit an authorization token 104 to a client device 102, such that the client device 102 can in turn provide the authorization token 104 to one or more services 108.

Figure 9:
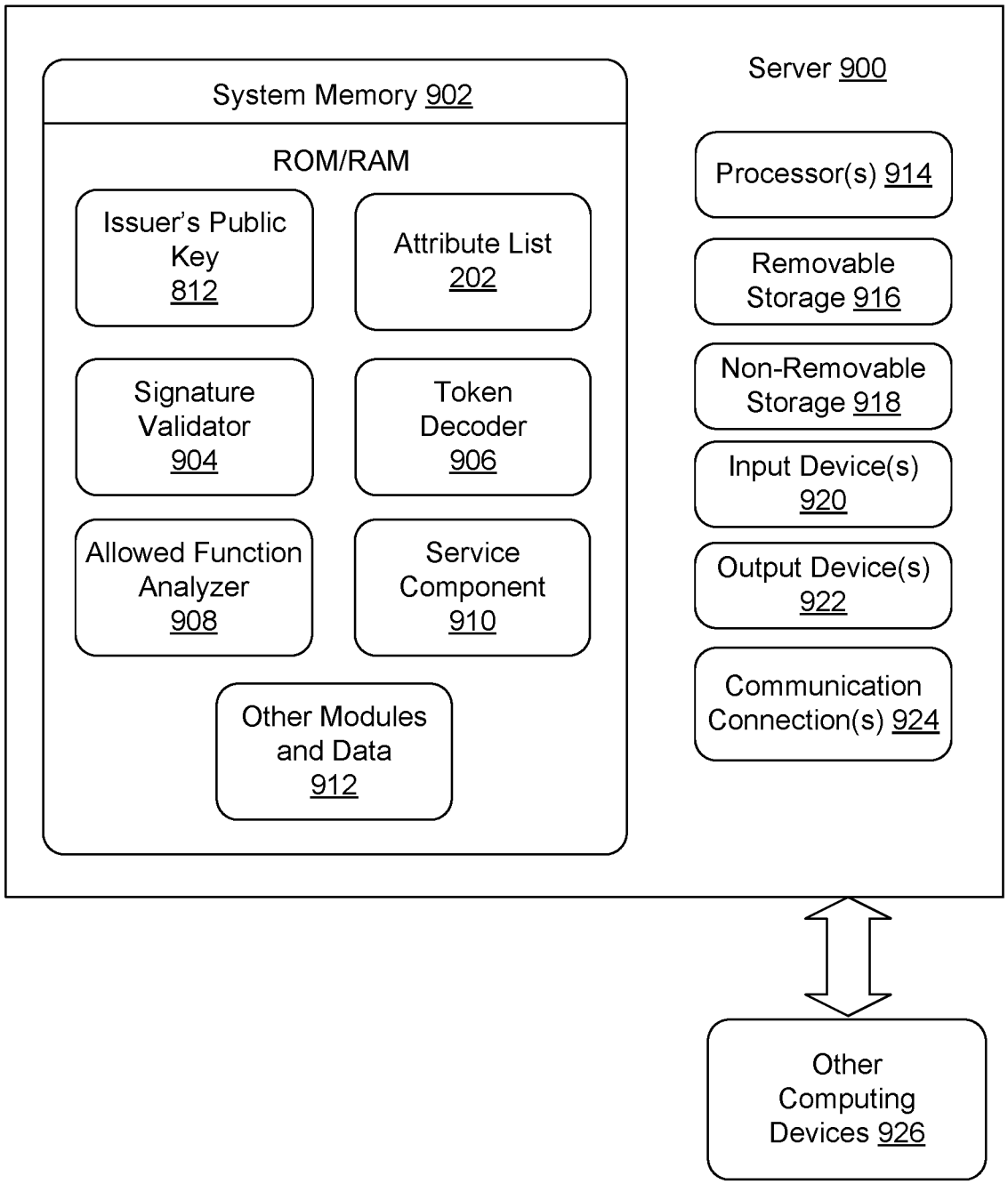
FIG. 9 illustrates an example architecture of a server of a service.

FIG. 9 illustrates an example architecture of a server 900 of a service 108. The server 900 can have a system memory 902. The system memory 902 can store data for the IDP's public key 812, the attribute list 202, a signature validator 904, a token decoder 906, an allowed function analyzer 908, a service component 910, and/or other modules and data 912. The server 900 can also include processor(s) 914, removable storage 916, non-removable storage 918, input device(s) 920, output device(s) 922, and/or communication connections 924 for communicating with other computing devices 926.

In various examples, system memory 902 is volatile (such as RAM), non-volatile (such as ROM, flash memory, etc.), or some combination of the two. Example system memory 902 can include one or more of RAM, ROM, EEPROM, a Flash Memory, a hard drive, a memory card, an optical storage, a magnetic cassette, a magnetic tape, a magnetic disk storage or another magnetic storage devices, or any other medium.

The issuer's public key 812 and the attribute list 202 are described in greater detail above. In some examples the public key 812 and/or attribute list 202 can be stored directly in the system memory 902 of a service's server 900. In other examples the public key 812 and/or attribute list 202 can be stored elsewhere, such as at a separate server of a telecommunication provider, and a server 900 of a service 108 can retrieve them when the server 900 receives an authorization token 104 from a client device 102.

The signature validator 904 can use the public key 812 to determine whether or not a signature 602 of an authorization token 104 is valid. If the signature validator 904 determines that the signature 602 is valid, the server 900 can trust the contents of the authorization token 104.

The token decoder 906 can decode and/or decompress the header 502 and/or body 504 of an authorization token 104. This can include decoding and/or decompressing an entitlement representation 402 and/or converting allowed function values 304 in the entitlement representation 402 into binary allowed function bitmasks 302.

The allowed function analyzer 908 can analyze an allowed function bitmask 302 from the entitlement representation 402. In some examples the server's allowed function analyzer 908 can be configured to check the values of one or more bits in specific bit positions 204 corresponding to one or more attributes 114 that the service 108 is interested in.

For example, if the service 108 is a promotional service that allows a client device 102 to download an MP3 song if the client device 102 is associated with a prepaid billing account, the allowed function analyzer 908 can check that an allowed function bitmask 302 for a billing account has a bit set to "1" at a bit position 204 associated with a "prepaid" attribute 114. As another example, if the service 108 is a telecommunication provider's service that adds a phone line to a billing account, the allowed function analyzer 908 can check that an allowed function bitmask 302 for a billing account has bits set to "1" at one or more bit positions 204 associated with attributes 114 that alone or in combination show eligibility to add a phone line.

In other examples, the allowed function analyzer 908 can convert an allowed function bitmask 302 into a list of text strings that describe attributes 114 and/or allowed functions associated with the authorization token 104. For example, the allowed function analyzer 908 can identify which attributes 114 in an attribute list 202 have their bits set to "1" in an allowed function bitmask 302, and generate a list of corresponding attributes 114 and/or allowed functions. Accordingly, the server 900 can use that text list when determining whether or not to implement the service 108, and/or keep it in its records for later review by human readers.

The service component 910 can implement the service 108, based at least in part on determining that the service 108 is allowed for a subscriber element 112 based on the allowed function bitmask 302 in an authorization token 104. For example, when the service 108 is a billing payment service and the server 900 receives an authorization token 104 from a client device 102 that indicates in an allowed function bitmask 302 that a user of the client device 102 is eligible to pay a certain type of bill, the service component 910 can cause a user interface to be displayed on the client device 102 through which the service component 910 can accept payment.

The other modules and data 912 can be utilized by the server 900 to perform or enable performing any action taken by the server 900 of the service 108. The other modules and data 912 can include a platform and applications, and data utilized by the platform and applications.

In some embodiments, the processor(s) 914 is a central processing unit (CPU), a graphics processing unit (GPU), or both CPU and GPU, or other processing unit or component known in the art.

Server 900 can also include additional data storage devices (removable and/or non-removable) such as, for example, magnetic disks, optical disks, or tape. Such additional storage is illustrated in FIG. 9 by removable storage 916 and non-removable storage 918. Computer storage media may include volatile and nonvolatile, removable and non-removable media implemented in any method or technology for storage of information, such as computer readable instructions, data structures, program modules, or other data. System memory 902, removable storage 916 and non-removable storage 918 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the server 900. Any such computer-readable storage media can be part of the server 900.

In various examples, any or all of system memory 902, removable storage 916, and non-removable storage 918, store programming instructions which, when executed, implement some or all of the above-described operations of the server 900.

The server 900 can also have input device(s) 920, such as a keyboard, a mouse, a touch-sensitive display, voice input device, etc., and output device(s) 922 such as a display, speakers, a printer, etc. These devices are well known in the art and need not be discussed at length here.

The server 900 can also contain communication connections 924 that allow the server 900 to communicate with other computing devices 926, such as client devices 102. By way of a non-limiting example, communication connections 924 can receive an authorization token 104 and service request from a client device 102, and/or other communications during the implementation of the service 108.

In some examples a telecommunication provider can provide the server 900 with a library that contains one or more of the issuer's public key 812, the attribute list 202, the signature validator 904, the token decoder 906, and/or the allowed function analyzer 908. Accordingly, the service 900 can use the provided library to validate and/or interpret an authorization token 104.

Example Operations

Figure 10:
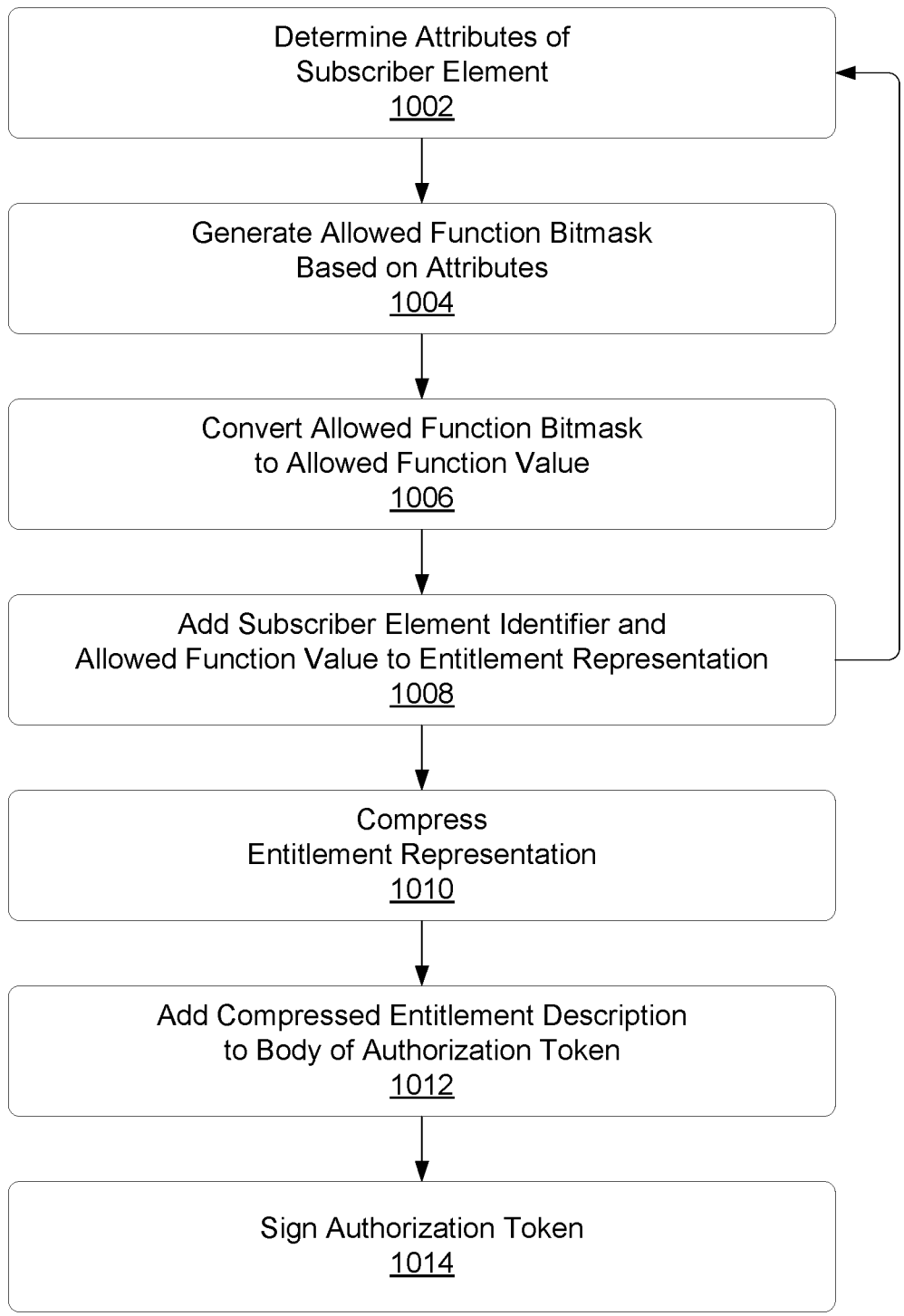
FIG. 10 depicts a flow chart of an exemplary process for generating an authorization token for a client device at an IDP.

FIG. 10 depicts a flow chart of an exemplary process for generating an authorization token 104 for a client device 102 at an IDP 106.

At block 1002, the IDP 106 can determine attributes 114 of a subscriber element 112 associated with a user of the client device 102, such as a user account, billing account, or subscription. The IDP 106 can determine the attributes 114 of a subscriber element 112 from a subscriber database 110.

At block 1004, the IDP 106 can generate an allowed function bitmask 302. In some examples the IDP 106 can set each bit of the allowed function bitmask 302 to "0" or "1" directly based on whether the subscriber element 112 has or does not have an attribute 114 corresponding to that bit position 204 on a predefined attribute list 202. In other examples the IDP 106 can generate a separate bitmask for each attribute 114 in the predefined attribute list 202 by setting a bit at the corresponding bit position 204 to "0" or "1" based on whether the subscriber element 112 has that attribute 114 and setting trailing bits to "0," and then adding the separate bitmasks together to generate the final allowed function bitmask 302.

At block 1006, the IDP 106 can convert the allowed function bitmask 302 into an allowed function value 304. In some examples the allowed function value 304 can be a decimal value. In other examples the allowed function value 304 can be expressed in hexadecimal or any other numeral form.

At block 1008, the IDP 106 can add the allowed function value 304 to an entitlement representation 402 in association with an identifier of the subscriber element 112. For example, the IDP 106 can add a decimal allowed function value 304 to an entitlement representation 402 in association with a userID, BAN, or MSISDN.

The IDP 106 can repeat blocks 1002 through 1008 for any or all of the subscriber elements associated with the user of the client device 102. For example, the user of the client device 102 can have one user account linked to two billing accounts, each with one or more subscriptions, and the IDP 106 can generate an entitlement representation 402 that includes allowed function values 304 for some or all of them.

At block 1010, after filling out the entitlement representation 402 with identifiers of subscriber elements 112 and associated allowed function values 304, the IDP 106 can compress and/or encode the entitlement representation 402. For example, the IDP 106 can compress the entitlement representation 402 using GZIP or any other compression algorithm, and then encode it using Base64 encoding or another encoding scheme so that it is expressed using a set of printable characters. In some examples block 1010 can be skipped if the entitlement representation 402 is to be included in the authorization token 104 in non-compressed form.

At block 1012, the IDP 106 can add the entitlement representation 402 as a claim in the body 504 of an authorization token 104. As indicated above, in some examples the entitlement representation 402 can be compressed and/or encoded prior to being added to the body 504 of the authorization token 104. The IDP 106 can also add other claims to the body, such as an "entitlement type" claim that indicates that the entitlement representation 402 is compressed and includes allowed function values 304. The IDP 106 can also prepare a header 502 for the authorization token 104.

At block 1014, the IDP 106 can use a cryptographic algorithm to generate a signature 602 for the authorization token 104 based on the header 502 and/or body 504. The IDP 106 can add the signature 602 to the authorization token 104. For example, the authorization token 104 can be a JWT that is formatted with an encoded version of the header 502, an encoded version of the body 504, and the signature 602 concatenated together with periods between them.

The IDP 106 can provide the authorization token 104 to the client device 102. The client device 102 can thereafter provide the authorization token 104 to one or more services 108. A service 108 can then use the entitlement description 402 in the authorization token 104 to locally verify that a subscriber element 112 associated with the client device has one or more attributes 114 that make the client device 102 eligible for the service 108.

Figure 11:
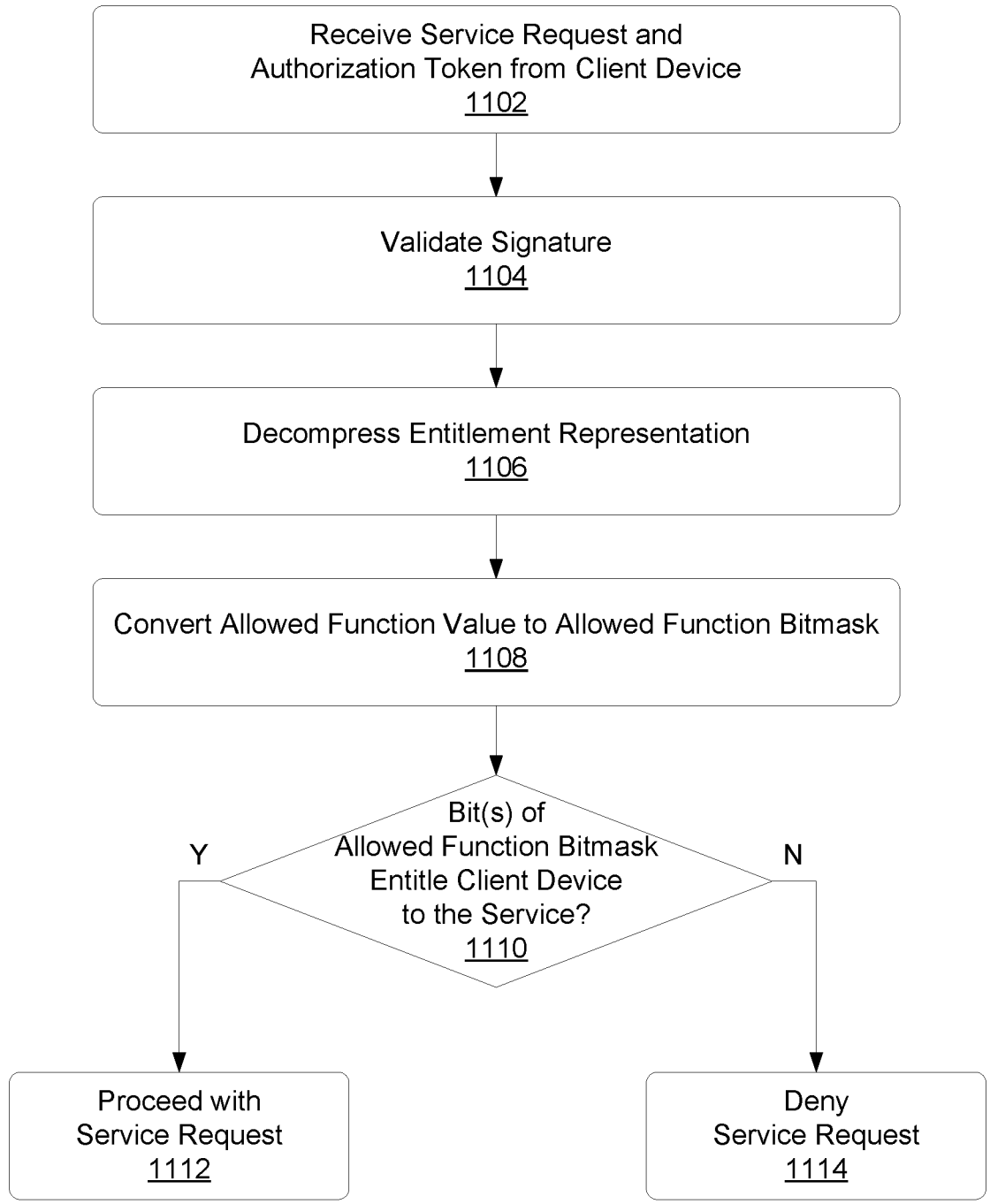
FIG. 11 depicts a flow chart of an exemplary process for a service to determine whether a client device is entitled to access the service, based on an authorization token provided by the client device.

FIG. 11 depicts a flow chart of an exemplary process for a service 108 to determine whether a client device 102 is entitled to access the service 108, based on an authorization token 104 provided by the client device 102.

At block 1102, a service 108 can receive an authorization token 104 from a client device 102 along with a request to access the service 108. For example, a web browser or another application running on the client device 102 can send a service request and the authorization token 104 to a server of the service 108.

At block 1104, the service 108 can validate the signature 602 of the authorization token 104. For example, the service 108 can use the issuer's public key 812 to verify the signature 602. If the service 108 is able to validate the signature 602, it can trust the contents of the authorization token's header 502 and body 504. If the header 502 and body 504 were encoded using Base64 encoding or any other encoding scheme, the service 108 can decode the header 502 and body 504 and recreate its original form, such as an arrangement of attribute-value pairs in a JWT.

At block 1106, the service 108 can decode and/or decompress the entitlement representation 402 from the body 504 of the authorization token 104. For example, if the entitlement representation 402 was compressed and Base64 encoded, the service 108 can reverse the Base64 encoding and then decompress the entitlement representation 402. In some examples, an entitlement type ("enttype") value can indicate a type of compression that was used to compress the entitlement representation 402, such that the service 108 can identify how to reverse the compression. If the entitlement representation 402 was not compressed, block 1106 can be skipped.

At block 1108, the service 108 can convert an allowed function value 304 from the entitlement representation 402 that is associated with a subscriber element 112 to an allowed function bitmask 302. For example, if the service 108 conditions access based on a particular type of subscriber element 112 having one or more specific attributes 114, the service 108 can identify the allowed function value 304 for that particular type of subscriber element 112, and convert that allowed function value 304 from decimal or another numeral system to a binary allowed function bitmask 302.

In some examples the client device 102 can identify in its service request which subscriber element 112 should be reviewed by the service 108 for attributes 114 that may qualify it for the service 108. For example, if a client device 102 makes a request to a service 108 to add a subscription to a particular billing account, the client device's service request can identify the BAN of that billing account. The service 108 can accordingly find an allowed function value 304 in the authorization token 104 that is associated with that BAN to determine if the billing account is qualified to add another subscription, even if allowed function values 304 for separate billing accounts are also included in the authorization token 104.

At block 1110, the service 108 can determine if one or more bits of the allowed function bitmask 302 entitle the user to access the service 108 through the client device 102. The service 108 can be configured with a set of one or more qualifying attributes 114 that a subscriber element 112 must have in order for the user to access the service 108. In some examples the service 108 can check bits in the allowed function bitmask 302 at one or more bit positions 204 corresponding to qualifying attributes 114 on a predefined attribute list 202 to determine if they are set to "1" and thereby indicate that the subscriber element 112 has the qualifying attributes 114. In other examples the service 108 can generate a list of attributes 114 that the subscriber element 112 has based on whether bits at corresponding bit positions 204 are set to "1" in the allowed function bitmask 302. The service 108 can then determine if the qualifying attributes 114 appear on the list of attributes 114 associated with the subscriber element 112.

If the allowed function bitmask 302 indicates at block 1110 that the subscriber element 112 has the one or more qualifying attributes 114 that entitle the client device 102 to access the service 108, the service 108 can move to block 1112 and proceed with one or more operations to implement the requested service 108. In some cases, the client device 102 may need to provide additional information for the service 108 to implement the requested service, such as a payment amount or credit card number. However, if the allowed function bitmask 302 indicates that the subscriber element 112 does not have the qualifying attributes 114 that entitle the client device 102 to access the service 108, the service 108 can deny the service request at block 1114.

In some examples a telecommunication provider can provide a service 108 with a library that includes scripts, applications, and/or other data for performing any or all of blocks 1104 through 1110.

Conclusion

As described above, an IDP 106 can include fine grain entitlement information in an authorization token 104 that it provides to a client device 102. The client device 102 can then provide the authorization token 104 to a service 108. Because the service 108 can locally determine whether or not the client device 102 is eligible for the service 108 from the fine grain entitlement information in the authorization token 104, the service 108 can avoid making network calls to the IDP 106 or other entities to determine if the client device 102 is eligible for the service 108. Similarly, if any intermediate layers are present between the client device and the service 108, those intermediate layers can also locally determine the client device's eligibility using the fine grain entitlement information in the authorization token 104, thereby avoiding additional network calls to determine the client device's eligibility.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method of generating an authorization token, the method comprising:
generating an allowed function bitmask for a subscriber element, the allowed function bitmask comprising bits at a plurality of bit positions that are set to values indicating whether the subscriber element has attributes associated with each of the plurality of bit positions on a predefined attribute list;
converting the allowed function bitmask to an allowed function value;
adding the allowed function value in an entitlement representation;
adding the entitlement representation to a body of an authorization token; and
signing the authorization token.

2. The method of claim 1, wherein the subscriber element is a user account, billing account, or subscription associated with a telecommunications provider.

3. The method of claim 1, further comprising compressing the entitlement representation prior to adding the entitlement representation to the body of the authorization token.

4. The method of claim 1, wherein whether the subscriber element has a particular attribute is determined based on information stored in a subscriber database.

5. The method of claim 1, wherein the allowed function bitmask is generated by directly setting bits in the allowed function bitmask at each of the plurality of bit positions to "0" or "1" based on whether the subscriber element has a particular attribute corresponding to that bit position on the predefined attribute list.

6. The method of claim 1, wherein the allowed function bitmask is generated by:
generating a separate binary value for each of the attributes on the predefined attribute list, the separate binary value including a leading bit set to "0" or "1" based on whether the subscriber element has the attribute, and zero or more trailing bits set to "0"; and
adding the separate binary values together to obtain the allowed function bitmask.

7. The method of claim 1, wherein signing the authorization token comprises:
generating a signature using a cryptographic algorithm with a private key on the body and a header of the authorization token; and
adding the signature to the authorization token.

8. A method of generating an authorization token, the method comprising:
generating an allowed function bitmask used to identify allowed functions associated with subscriber elements, respectively, associated with a subscriber of a telecommunication provider, the allowed function bitmask comprising groups of bits in a plurality of bits, the groups of bits having values indicating whether telecommunication service attributes are included in the subscriber elements, respectively;
generating an entitlement representation based at least in part on the allowed function bitmask; and
adding the entitlement representation to a body of an authorization token.

9. The method of claim 8, wherein generating the entitlement representation further comprises:
converting the allowed function bitmask to an allowed function value; and
adding the allowed function value in the entitlement representation.

10. The method of claim 8, further comprising:
controlling access for a user to a service based on the telecommunication service attributes of the subscriber elements, respectively.

11. The method of claim 8, wherein a subscriber element of the subscriber elements is a user account, billing account, or subscription associated with the telecommunications provider.

12. The method of claim 8, wherein first bits of the plurality of bits in the allowed function bitmask are set to first values indicating that a subscriber entity has the telecommunication service attributes corresponding to the first bits, respectively, and
wherein second bits of the plurality of bits in the allowed function bitmask are set to second values indicating that a subscriber entity does not have the telecommunication service attributes corresponding to the second bits, respectively.

13. The method of claim 8, further comprising:
signing the authorization token to indicate that an issuing entity generated the authorization token.

14. The method of claim 8, further comprising:
inserting, into the authorization token, a signature generated with a cryptographic algorithm.

15. The method of claim 8, wherein the telecommunication service attributes include a telecommunication service attribute indicating a function that a user has been permitted to perform in association with a subscriber element of the subscriber elements.

16. A server of a service, the server comprising:
one or more processors;
a communication connection; and
memory storing computer-executable instructions that, when executed by the one or more processors, cause the one or more processors to perform operations comprising:
generating an allowed function bitmask for a subscriber element, the allowed function bitmask comprising bits at a plurality of bit positions that are set to values indicating whether the subscriber element has attributes associated with each of the plurality of bit positions on a predefined attribute list;
converting the allowed function bitmask to an allowed function value;
adding the allowed function value in an entitlement representation;

adding the entitlement representation to a body of an authorization token; and signing the authorization token.

17. The server of claim 16, wherein the subscriber element is a user account, billing account, or subscription associated with a telecommunications provider.

18. The server of claim 16, wherein whether the subscriber element has a particular attribute is determined based on information stored in a subscriber database.

19. The server of claim 16, wherein the allowed function bitmask is generated by directly setting the bits in the allowed function bitmask at each of the plurality of bit positions to "0" or "1" based on whether the subscriber element has a particular attribute corresponding to that bit position on the predefined attribute list.

20. The server of claim 16, wherein the allowed function bitmask is generated by:

generating a separate binary value for each of the attributes on the predefined attribute list, the separate binary value including a leading bit set to "0" or "1" based on whether the subscriber element has the attribute, and zero or more trailing bits set to "0"; and adding the separate binary values together to obtain the allowed function bitmask.

* * * * *